Patented Sept. 25, 1945

2,385,613

UNITED STATES PATENT OFFICE 2,385,613

INKS

Alex Brooking Davis, Cincinnati, Ohio, assignor to
A. B. Dick Company, Chicago, Ill., a corporation
of Illinois No Drawing. Application May 19, 1941,
Serial No. 394,187

11 Claims. (Cl. 106—29)

This invention relates to inks and more particularly to duplicating inks for use in stencil duplicating processes. This application is a continuation-in-part of my copending application Serial No. 206,205, filed May 5, 1938.

The duplicating apparatus and process in which the inks of this invention are employed contemplate the use of an ink reservoir provided with a perforated ink feeder plate. The perforated feeder plate is covered by an absorbent pad which carries a stencil. The ink in the reservoir passes through the perforations in the feeder plate and is absorbed by the pad. When it is desired to form an impression on paper or other surfaces, a stencil is placed over the absorbent pad and the ink is allowed to pass through the openings in the stencil to the paper.

In the foregoing process and apparatus it is necessary that the ink remain in the reservoir and the absorbent pad for relatively long periods of time. During such periods the ink must be maintained in a fluid state to avoid clogging and insure ready feeding at all times. The ink should, furthermore, remain homogeneous and physically stable. Finally the ink must be capable of drying rapidly when it is deposited on the impression sheet.

It is the principal object of this invention to provide a duplicating ink which remains fluid and homogeneous when exposed to the air for long periods of time.

A further object of this invention is to provide an ink which will dry rapidly upon application of a thin film to an impression sheet.

Still another object of this invention is to provide a duplicating ink the vehicle of which comprises a substantially anhydrous solution which is non-volatile and stable at normal temperatures but which dries rapidly when extended into a thin film.

A still further object of this invention is to provide a duplicating ink which is adapted for use on non-absorbent, sized, hard or bond papers.

The duplicating ink of this invention comprises a vehicle which consists essentially of a solution of a resin or a resin soap in a glycol, together with coloring matter which may be either a dye or a pigment. When the coloring matter consists of a pigment, the solution may contain emulsifying agents and emulsion stabilizers to help maintain the pigment in suspension.

The ink may contain either a synthetic resin, a modified natural resin or a natural resin binder. It is preferred to employ a resin from one of these classes which is saponifiable. Polycarboxylic acid-polyhydric alcohol resins such as glycerol phthalate resin have been found to be the most satisfactory synthetic resin binders. However, under certain conditions urea-formaldehyde resins may be employed. Of the modified natural resin binders, hydrogenated rosin and purified residue from rosin production sold commercially as "Vinsol," have been found suitable. Natural resin binders such as shellac or congo resin may also be employed.

The preferred method of preparing the inks of this invention contemplates saponifying the resin with a base to form a water-soluble resin soap. An inorganic base such as sodium, potassium, or ammonium hydroxide may be employed for this purpose, or an organic base such as triethanolamine may be used. It is preferred, however, to use borax to obtain the resin soap.

The saponification of the resin is carried out in a glycol which acts as a solvent for the resin soap obtained. The glycol employed for this purpose is preferably an alkyl glycol and obviously must be one which will act as solvent for the resin soap. A further limitation upon the type of glycol employed is that it be fluid at normal temperatures and capable of drying rapidly when spread in a thin film. Among the glycols which meet these requirements are ethylene glycol, butylene glycol and propylene glycol. It has been found that glycols containing more than four carbon atoms do not meet one or more of the previously mentioned requirements. It is preferred to employ ethylene glycol though other suitable glycols may be readily determined by persons skilled in the art. Certain glycols having ether linkages have been found to be applicable in the present invention such as for example diethylene glycol, but compounds of this class may be objectionable in certain circumstances owing to their solvent action upon cellulose derivatives, which materials constitute the film-forming ingredient of most of the stencils now in use. Obviously such solvents will cause the stencils to rapidly deteriorate and where the stencils are formed of materials of the character mentioned the use of such solvents is avoided even though they may be otherwise satisfactory.

It is interesting to note that other polyhydric compounds such as glycerine which are sometimes considered the equivalents of glycols are not applicable to the present invention. In this connection it was found that a shellac soap obtained by saponifying a purified and dewaxed shellac with borax was not soluble in glycerine. Samples of such glycerine products were also spread in thin films to test their drying properties, and it was ascertained that such samples were substantially non-drying and after about two days remained as soft as when spread.

In making the inks it is usually the practice to prepare the glycol solution of resin soap first, though an ink possessing the desired properties may be obtained by incorporating the several ingredients thereof at one time. The following formulas are given to illustrate various resin soap vehicles which have been employed with success.

Example I

| | Parts by weight |
|---|---|
| Glycerol-phthalate resin | 27.6 |
| Borax | 16.6 |
| Ethylene glycol | 41.5 |
| Carbon black | 14.3 |

Example II

| | Parts by weight |
|---|---|
| Hydrogenated rosin | 30.6 |
| Triethanolamine | 9.2 |
| Ethylene glycol | 45.9 |
| Carbon black | 14.3 |

Example III

| | Parts by weight |
|---|---|
| Shellac (dewaxed or bleached) | 30.3 |
| Borax | 9.1 |
| Ethylene glycol | 60.6 |

Example IV

| | Parts by weight |
|---|---|
| Shellac (dewaxed) | 31.3 |
| Triethanolamine | 6.3 |
| Ethylene glycol | 62.4 |

The pigment may be directly ground into the resin soap solution, or it may be incorporated later along with other modifying ingredients in quantities and by practices well known in the art.

It may be desirable to incorporate in the inks certain modifying ingredients containing water particularly if the vehicle contains substances which impart hygroscopic properties to the ink. Thus, if desired, aqueous solutions of a neutral sulphonated oil such as sulphonated castor oil, sulphonated sperm oil, sulphonated olive oil or sulphonated mineral oil may be emulsified in the substantially anhydrous soap solution. While the foregoing sulphonated oils may be effectively employed, it is preferred to employ water-soluble castor oil consisting of 45 parts by weight of castor oil and 55 parts by weight of triethanolamine. These two ingredients are in solution and upon dilution the triethanolamine peptizes the castor oil and permanently emulsifies it. It is, furthermore, desirable in some instances to add small amounts of aqueous solutions of hygroscopic salts, as for example, an aqueous solution of sodium lactate. The various modifying ingredients are added to the resin soap solutions to place the ink in its final form. The pigment dispersed therein remains in suspension in the emulsions for an indefinite period of time.

The following examples are given to illustrate the final composition of the inks:

Example V

| | Parts by weight |
|---|---|
| Resin soap solution of Example I | 50 |
| Ethylene glycol | 50 |

Example VI

| | Parts by weight |
|---|---|
| Resin soap solution of Example I | 50 |
| Water-soluble castor oil | 50 |

Example VII

| | Parts by weight |
|---|---|
| Resin soap solution of Example I | 50 |
| Ethylene glycol | 40 |
| Water-soluble castor oil | 10 |

Example VIII

| | Parts by weight |
|---|---|
| Resin soap solution of Example II | 50 |
| Ethylene glycol | 50 |

Example IX

| | Parts by weight |
|---|---|
| Resin soap solution of Example II | 50 |
| Water-soluble castor oil | 50 |

Example X

| | Parts by weight |
|---|---|
| Resin soap solution of Example II | 50 |
| Ethylene glycol | 40 |
| Water-soluble castor oil | 10 |

Example XI

| | Parts by weight |
|---|---|
| Resin soap solution of Examples III or IV | 45 |
| Ethylene glycol | 25 |
| Heavy mineral oil | 10 |
| Commercial lamp black | 10 |
| 70% aqueous solution of neutral sulphonated castor oil | 5 |

The compositions in Examples V to XI are thoroughly emulsified by repeated agitation or by passing the composition through a mill. While the inks may be brought to the desired concentration and consistency with ethylene glycol, it is preferred to employ water-soluble castor oil for this purpose either solely or in conjunction with ethylene glycol. The water-soluble castor oil is the previously described composition of straight castor oil and triethanolamine.

Alternatively, satisfactory inks have been prepared from partially condensed urea-formaldehyde resins dissolved in ethylene glycol. In an ink of this type it is preferable to incorporate a small percentage of an alkaline material such as borax. It has, furthermore, been possible to prepare a particularly satisfactory ink of the desired characteristics by compounding shellac and propylene glycol. Such an ink, for instance, may be formed as follows:

Example XII

| | Parts by weight |
|---|---|
| Propylene glycol | 69.7 |
| Flake gum shellac | 30.3 |
| Lampblack | 7.0 |
| Propylene glycol | 15.0 |
| 60% aqueous sodium lactate solution | 25.0 |

It will be noted that in inks made with vehicles such as set forth in Example XII, or those prepared from urea formaldehyde, the resins are not saponified.

The inks prepared according to all the above formulas remain fluid in the ink pad or duplicating machine for several weeks and will not show deterioration after standing for months in the reservoir of a duplicating machine. They give clean, clear, sharp, prints through the usual stencils even upon hard, bond papers or papers which have been sized with glue or casein, and such prints dry smudge-free on standing for a few minutes. The prints may, however, be dried entirely free of off-set in from thirty to sixty seconds in an air blast of 140°–160° F. and may be immediately piled without the necessity of interleaving.

The mineral oil and the sulphonated oil included in my formulae add to the ink definite properties in that they promote the wetting of the surface of the bond paper by the other ingredients and assist penetration, thus mitigating the tendency of the printed ink films to contract and form drops on the paper surface. Their principal function, therefore, is that of aiding the ink to wet and penetrate the surface of the paper, so as to preserve the shape of the printed character, and this action is lost if they are not present. If a sulphonated oil is included in the ink composition it is preferred to omit the mineral oil.

The formation of the emulsion referred to helps to support the pigment of the ink, and prevents settling for an indefinite period. This emulsion is very stable in all kinds of weather due to the hygroscopic properties of the ethylene glycol, the sulphonated oil and the sodium lactate. The sulphonated oil, and to some extent the sodium lactate, therefore, act as a control for the emulsion, and the sodium lactate in addition acts as a leaven for keeping the pores of the emulsion open and also to prevent curdling.

While the inks of this invention do contain some water, their water content is so combined with hygroscopic substances that it is substantially preserved on exposure to air. The percentage of water to the hygroscopic substances is relatively very small, and while the ink may take on moisture due to the slight hygroscopic properties of the ethylene glycol, and the other deliquescent substances present, and a portion of this moisture may be given up in dry weather, the viscosity of the ink and its working properties at ordinary temperatures are not materially affected by changes in the weather.

From the foregoing description it will be apparent that this invention provides an ink which may be used to produce prints by stencil duplication on sized paper and other smooth, hard sheets, which prints can be immediately dried by the moderate use of heat, and which can be piled and handled without smearing or off-set. This ink also is stable and non-volatile, and retains its fluidity for long periods in use in a duplicating machine without becoming thick or gummy and without separation, and is substantially unaffected by changes in weather.

While there are set forth above certain specific ingredients, steps and quantities, it will be appreciated that various modifications may be made therein by those skilled in the art without exceeding the scope of the appended claims, by which alone my invention is to be defined.

I claim:

1. A duplicating ink characterized by the property of rapid drying upon application to an impression sheet comprising an alkyl glycol containing not more than four carbon atoms which is fluid at normal temperatures and dries rapidly when spread in a thin film, a water-soluble resin soap dissolved therein, and a pigment, said ink being capable of readily passing through the absorbent pad of a duplicating machine and adapted to remain fluid therein over relatively long periods of time.

2. A substantially anhydrous duplicating ink as set forth in claim 1 wherein the alkyl glycol is ethylene glycol.

3. A duplicating ink adapted to rapidly dry upon application to paper or other print-receiving medium, comprising as the predominant ingredient a glycol containing not more than four carbon atoms, which is fluid at normal temperatures and dries rapidly when spread in a thin film, a water-soluble natural resin soap dissolved therein, and a pigment, said ink being substantially anhydrous and capable of readily passing through the pad of a duplicating machine and adapted to remain fluid therein over relatively long periods of time.

4. A duplicating ink adapter to rapidly dry upon application to paper or other print-receiving medium, comprising as the predominant ingredient a solution of a water-soluble shellac soap in a glycol containing not more than four carbon atoms, which is fluid at normal temperatures and dries rapidly when spread in a thin film, and also containing smaller amounts of a pigment, and a neutralized sulphonated oil soluble in said glycol, said ink being substantially anhydrous and capable of readily passing through the pad of a duplicating machine and adapted to remain fluid therein over relatively long periods of time.

5. A duplicating ink adapted to rapidly dry upon application to paper or other print-receiving medium, comprising as the predominant ingredient an ethylene gylcol solution of a water-soluble shellac soap, and also containing smaller amounts of a pigment, a neutralized sulphonated oil, and a water-soluble hygroscopic salt, said ink being substantially anhydrous and capable of readily passing through the pad of a duplicating machine and adapted to remain fluid therein over relatively long periods of time.

6. A duplicating ink adapted to rapidly dry upon application to paper or other print-receiving medium, comprising as the predominant ingredient an anhydrous solution of a borax shellac soap in ethylene glycol, and also containing smaller amounts of a pigment, neutralized sulphonated castor oil, and sodium lactate, said ink being substantially anhydrous and capable of readily passing through the pad of a duplicating machine and adapted to remain fluid therein over relatively long periods of time.

7. A duplicating ink characterized by the property of rapid drying upon application to an impression sheet comprising an alkyl glycol containing not more than four carbon atoms which is fluid at normal temperature and which dries rapidly when spread in a thin film, a resin and an alkali dissolved therein, and a pigment, said ink being capable of readily passing through the absorbent pad of the duplicating machine and adapted to remain fluid therein over relatively long periods of time.

8. A duplicating ink characterized by the property of rapid drying upon application to an impression sheet comprising a vehicle consisting of a glycol having not more than four carbon atoms, which is fluid at normal temperatures and dries rapidly when spread in a thin film, and a glycerol phthalate resin soap dissolved therein, and a pigment, said ink being capable of readily passing through the absorbent pad of a duplicating machine and adapted to remain fluid therein over relatively long periods of time.

9. A duplicating ink characterized by the property of rapid drying upon application to an impression sheet comprising a vehicle consisting of a glycol having not more than four carbon atoms, which is fluid at normal temperatures and dries rapidly when spread in a thin film, and a hydrogenated rosin soap dissolved therein, and a pigment, said ink being capable of readily passing through the absorbent pad of a duplicating machine and adapted to remain fluid therein over relatively long periods of time.

10. A duplicating ink characterized by the property of rapid drying upon application to an impression sheet comprising a vehicle consisting of glycol having not more than four carbon atoms, which is fluid at normal temperatures and dries rapidly when spread in a thin film, and a shellac soap dissolved therein, and a pigment, said ink being capable of readily passing through the absorbent pad of a duplicating machine and adapted to remain fluid therein over relatively long periods of time.

11. A duplicating ink characterized by the property of rapid drying upon application to an impression sheet comprising propylene glycol and a shellac soap dissolved therein, and a pigment, said ink being capable of readily passing through the absorbent pad of a duplicating machine and adapted to remain fluid therein over relatively long periods of time.

ALEX BROOKING DAVIS.